US011797604B1

United States Patent
Nagalla et al.

(10) Patent No.: US 11,797,604 B1
(45) Date of Patent: Oct. 24, 2023

(54) ACCOUNT AGGREGATION USING EMAIL DATA

(71) Applicant: MASSACHUSETTS MUTUAL LIFE INSURANCE COMPANY, Springfield, MA (US)

(72) Inventors: Durga Nagalla, Woburn, MA (US); Ryan White, Springfield, MA (US)

(73) Assignee: Massachusetts Mutual Life Insurance Company, Springfield, MA (US)

( * ) Notice: Subject to any disclaimer, the term of this patent is extended or adjusted under 35 U.S.C. 154(b) by 336 days.

(21) Appl. No.: 16/123,950

(22) Filed: Sep. 6, 2018

Related U.S. Application Data

(60) Provisional application No. 62/554,898, filed on Sep. 6, 2017.

(51) Int. Cl.
*G06F 16/583* (2019.01)
*H04L 9/40* (2022.01)
*G06Q 40/12* (2023.01)
*G06F 16/23* (2019.01)

(52) U.S. Cl.
CPC ...... *G06F 16/5846* (2019.01); *G06F 16/2379* (2019.01); *G06Q 40/12* (2013.12); *H04L 63/083* (2013.01); *G06Q 2220/00* (2013.01)

(58) Field of Classification Search
CPC .... G06F 21/31; G06Q 40/00; G06Q 30/0269; H04L 9/3213; H04M 15/8011
USPC .................................................. 705/35, 14.53
See application file for complete search history.

(56) References Cited

U.S. PATENT DOCUMENTS

| | | | | |
|---|---|---|---|---|
| 7,860,934 B1* | 12/2010 | Wolfe | ..................... | G06Q 40/02 709/224 |
| 8,412,605 B2* | 4/2013 | Griffin | ..................... | G06Q 40/00 340/5.81 |
| 2005/0240774 A1* | 10/2005 | Angus | ..................... | H04L 63/10 713/182 |
| 2009/0319411 A1* | 12/2009 | Debie | ..................... | G06Q 40/02 705/35 |
| 2011/0077936 A1* | 3/2011 | Arumugam | ........... | G06F 40/289 704/9 |
| 2013/0253976 A1* | 9/2013 | Shukla | ................. | G06Q 10/107 705/7.26 |

(Continued)

*Primary Examiner* — Christine M Behncke
*Assistant Examiner* — Henry H Jung
(74) *Attorney, Agent, or Firm* — Foley & Lardner LLP

(57) ABSTRACT

Disclosed herein are embodiments of systems, methods, and products comprises an analytic server, which aggregates different accounts for a user. The analytic server queries data associated with the user. From the queried data, the analytic server determines the accounts and the account servers. From the account servers, the analytic server queries the transactions of the accounts. The analytic server generates an instance to aggregate the determined accounts and transactions. The analytic server further scans the user's email content to determine potentially unknown transactions. The analytic server compares the potentially unknown transaction from the email content with the transactions in the instance. If there is no match, the analytic server determines the account of the potentially unknown transaction from the email content is a new account that is not aggregated. The analytic server notifies the user regarding the new account and updates the instance to reflect the new account.

20 Claims, 7 Drawing Sheets

(56) References Cited

U.S. PATENT DOCUMENTS

| | | | | |
|---|---|---|---|---|
| 2013/0325681 | A1* | 12/2013 | Somashekar | H04M 15/851 |
| | | | | 705/35 |
| 2014/0019352 | A1* | 1/2014 | Shrivastava | G06Q 20/326 |
| | | | | 705/41 |
| 2014/0180807 | A1* | 6/2014 | Boal | G06Q 30/0269 |
| | | | | 705/14.53 |
| 2015/0120555 | A1* | 4/2015 | Jung | G06Q 50/01 |
| | | | | 705/44 |
| 2015/0324736 | A1* | 11/2015 | Sheets | G06Q 10/083 |
| | | | | 705/330 |
| 2016/0239853 | A1* | 8/2016 | Cummins | G06Q 30/0201 |
| 2016/0328803 | A1* | 11/2016 | Whitley | G06Q 10/107 |
| 2017/0068954 | A1* | 3/2017 | Hockey | H04L 9/3213 |
| 2017/0200162 | A1* | 7/2017 | Pourfallah | G06Q 20/405 |
| 2017/0255793 | A1* | 9/2017 | Caldwell | G06F 21/31 |
| 2018/0218446 | A1* | 8/2018 | Ries | H04L 63/0853 |

* cited by examiner

ACCOUNT AGGREGATION USING EMAIL DATA

CROSS-REFERENCE TO RELATED APPLICATIONS

This application claims priority to U.S. Provisional Patent Application Ser. No. 62/554,898, entitled "Methods and Systems for Account Aggregation Using Email Receipts," filed Sep. 6, 2017, which is hereby incorporated by reference in its entirety.

TECHNICAL FIELD

This application relates generally to methods and systems for aggregating accounts based on email data.

BACKGROUND

As the processing power of computers allow for greater computer functionality and the Internet and network technology era allow for interconnectivity between computing systems, many users utilize software solutions to manage their financial needs. Currently some software solutions provide an aggregated view of the users' finances. For example, software (e.g., an application) may provide financial management services by tracking the user's financial behaviors across multiple accounts. To track the users' financial behavior, the application may need to aggregate different accounts to have a holistic view of each user's finances. However, conventional methods and software solutions for aggregating accounts have created several technical shortcomings and a new set of technical challenges.

Specifically, in the existing and conventional methods, conventional applications require the user to manually input his/her financial account information, such as bank accounts, credit card accounts, mortgage accounts, loan accounts, investment accounts, and the like. This process is inefficient, and the setup of the application is inconvenient and creates a negative user experience. For instance, considering the account information is not always easy to remember, the user may have to obtain such information from other sources and systems. Thus, this manual input process is time consuming, complex, and error prone. Furthermore, these conventional methods may not be able to capture the user's complete financial portfolio. The most recent financial information for a user may be missing. For example, the user may forget to input one or more financial accounts, or the user may open a new credit card account after inputting his/her financial information. The new financial accounts may not be included in the application, resulting in a less accurate financial management service provided by the application. As a result, potential clients may be discouraged from using the application due to the complexity and the heavy burden of manually updating the financial accounts in a timely way.

SUMMARY

For the aforementioned reasons, there is a need for a more accurate and efficient system and method that would allow a server to continuously monitor and automatically generate and update existing and new accounts in the application corresponding to each of the user's bank accounts, credit card accounts, mortgage accounts, loan accounts, investment accounts and other financial accounts. Discussed herein are systems and methods for automatically determining the user's financial accounts and updating the portfolio by adding new accounts or remove old accounts when the user opens or closes an account.

In one embodiment, a method comprises receiving, by a server from an electronic client device operated by a user, a first request to identify and aggregate transaction data from one or more accounts associated with the user, the first request comprising authentication credentials for each account within the one or more accounts; querying, by the server using the received authentication credentials, a first website associated with each account within the one or more accounts to identify one or more transactions associated with each account where each transaction within the one or more transactions comprises a first account identifier corresponding to at least one account within the one or more accounts; generating, by the server, an instance within a database corresponding to the user and comprising the one or more transactions associated with each account; displaying, by the server on the electronic client device, a graphical user interface comprising one or more inputs fields configured to receive an email credential of an email account associated with the user; accessing, by the server, the email account by inputting the received email credential into a second website associated with the email account; continuously scanning, by the server, content of the email account, wherein the scanning comprises at least parsing words of each email message to identify a potentially unknown transaction; determining, by the server, a second account identifier associated with the potentially unknown transaction; determining, by the server, whether the second account identifier associated with the potentially unknown transaction corresponds to at least one account within the one or more accounts by identifying whether the instance comprises the second account identifier; when the second account identifier associated with the potentially unknown transaction does not correspond to at least one account within the one or more accounts; generating, by the server, a notification to alert the user regarding the second account identifier; and updating, by the server, the instance within the database to reflect the second account identifier by adding the second account identifier and the potentially unknown transaction into the database.

In another embodiment, a system comprises an electronic client device, a server in communication with the electronic client device and configured to: receive, from the electronic client device operated by a user, a first request to identify and aggregate transaction data from one or more accounts associated with the user, the first request comprising authentication credentials for each account within the one or more accounts; query, using the received authentication credentials, a first website associated with each account within the one or more accounts to identify one or more transactions associated with each account where each transaction within the one or more transactions comprises a first account identifier corresponding to at least one account within the one or more accounts; generate an instance within a database corresponding to the user and comprising the one or more transactions associated with each account; display, on the electronic client device, a graphical user interface comprising one or more inputs fields configured to receive an email credential of an email account associated with the user; access the email account by inputting the received email credential into a second website associated with the email account; continuously scan content of the email account, wherein the scanning comprises at least parsing words of each email message to identify a potentially unknown transaction; determine a second account identifier associated with the potentially unknown transaction; determine whether the second account identifier associated with the potentially unknown transaction corresponds to at least one account within the one or more accounts by identifying whether the instance comprises the second account identifier; when the second account identifier associated with the potentially unknown transaction does not correspond to at least one account within the one or more accounts: generate a notification to alert the user regarding the second account identifier; and update the instance within the database to reflect the second account identifier by adding the second account identifier and the potentially unknown transaction into the database.

It is to be understood that both the foregoing general description and the following detailed description are exemplary and explanatory and are intended to provide further explanation of the disclosed embodiments and subject matter, as claimed.

BRIEF DESCRIPTION OF THE DRAWINGS

The accompanying drawings constitute a part of this specification and illustrate embodiments of the subject matter disclosed herein.

DETAILED DESCRIPTION

Figure 1:
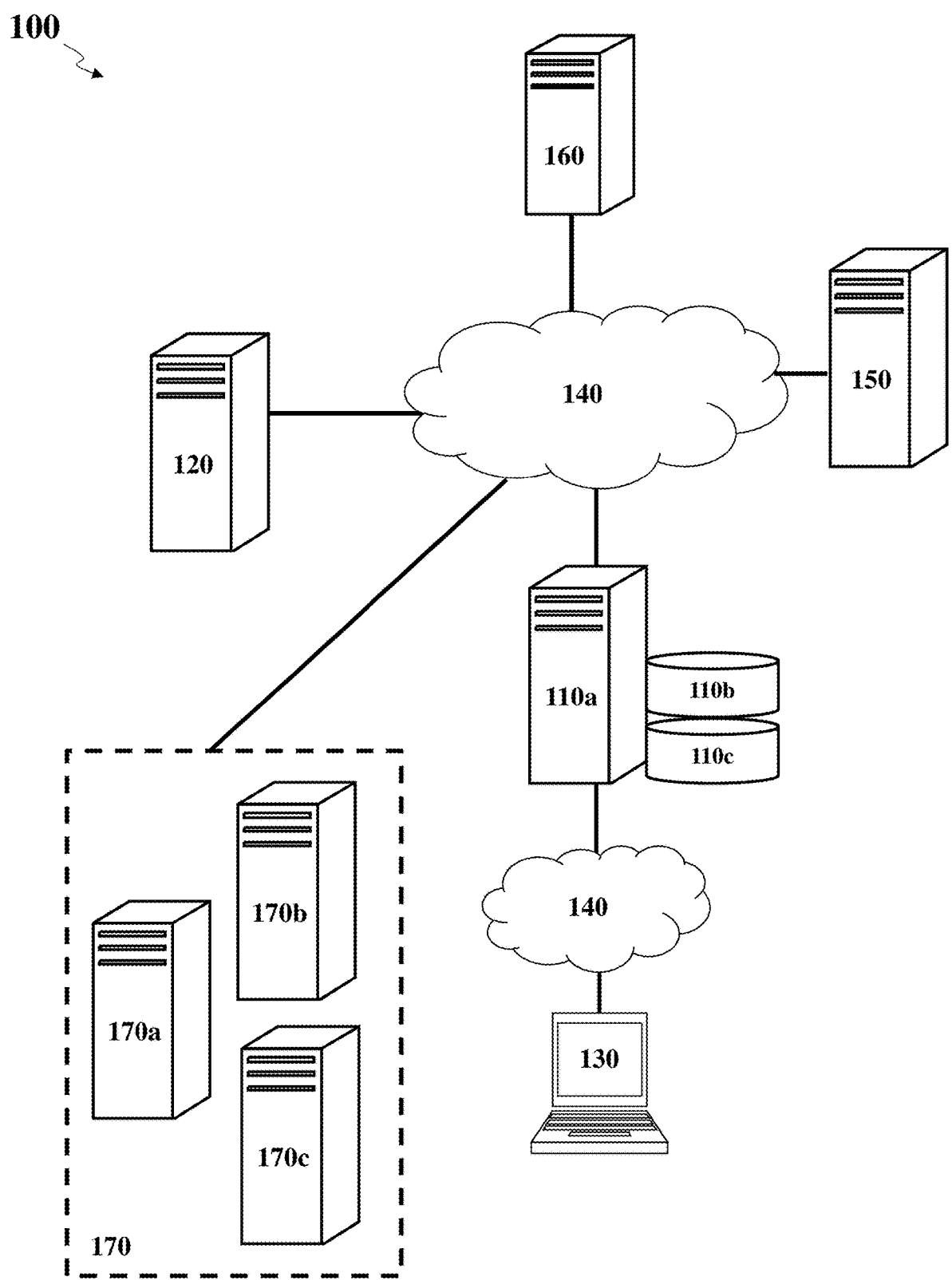
FIG. 1 illustrates a computer system for aggregating accounts, according to an embodiment.

Reference will now be made to the illustrative embodiments illustrated in the drawings, and specific language will be used here to describe the same. It will nevertheless be understood that no limitation of the scope of the claims or this disclosure is thereby intended. Alterations and further modifications of the inventive features illustrated herein, and additional applications of the principles of the subject matter illustrated herein, which would occur to one ordinarily skilled in the relevant art and having possession of this disclosure, are to be considered within the scope of the subject matter disclosed herein. The present disclosure is here described in detail with reference to embodiments illustrated in the drawings, which form a part here. Other embodiments may be used and/or other changes may be made without departing from the spirit or scope of the present disclosure. The illustrative embodiments described in the detailed description are not meant to be limiting of the subject matter presented here.

FIG. 1 illustrates components of a system 100 for aggregating accounts, according to an embodiment. The system may include any number of computing devices. The system may comprise an analytic server 110a with a profile database 110b and a transaction database 110c, an electronic client device 130, a credit bureau server 150, a merchant system 160, an email server 120, and a bank system server 170 that may include a set of bank system servers 170a, 170b, and 170c. The electronic client device 130 may be connected to the analytic server 110a via hardware and software components of one or more networks 140. Further, the analytic server may be connected with the credit bureau server 150, the merchant system 160, the email server 120, and the set of bank system servers 170a, 170b, 170c via the network 140. A network 140 may also connect various computing devices with databases or other components of the systems 100. Examples of the network 140 include, but are not limited to, Local Area Network (LAN), Wireless Local Area Network (WLAN), metropolitan Area Network (MAN), Wide Area Network (WAN), and the Internet. The communication over the network 140 may be performed in accordance with various communication protocols, such as Transmission Control Protocol and Internet Protocol (TCP/IP), User Datagram Protocol (UDP), and IEEE communication protocols.

The electronic client device 130 may be any computing device comprising a process/microcontroller and/or any other electronic component that allows a participant/user to interact with analytic server 110a and perform the various tasks and processes described herein. The examples of the electronic client device 130 may include, but are not limited to, a desktop computer, a laptop, a personal digital assistant (PDA), a smartphone, a tablet computer, and the like.

The electronic client device 130 may execute an Internet browser or local application that accesses the analytic server 110a in order to issue requests or instructions. The electronic client device 130 may transmit credentials from user inputs to the analytic server 110a, from which the analytic server 110a may authenticate the user and/or determine a user's role based on records in a profile database 110b. If the user is a new user who has not registered, the electronic client device 130 may transmit registration requests to the analytic server 110a. The registration requests may include the user's identification information and other information that is required by the server for new user registration. The analytic server 110a may generate an account for the user, and save the user's identification information and other required information to a profile database 110b. The electronic client device 130 may comprise any number of input devices configured to receive any number of data inputs, including various types of data inputs allowing for authentication (e.g. username, password, certificates, and biometrics).

The electronic client device 130 may be configured to communicate with the analytic server 110a through one or more networks 140, using wired and/or wireless communication capabilities. In operation, the electronic client device 130 may execute a program, which may include a graphical user interface (GUI) that renders an interactive layout, schematic, or other elements for the user to input a request. For example, the user may include a text based interface allowing the user to enter manual commands.

An analytic server 110a may be any computing device comprising a processor and other computing hardware and software components, configured to process the requests received from the electronic client device 130 and provide various services for the user. The analytic server 110a may be logically and physically organized within the same or different devices or structures, and may be distributed across any number of physical structures and locations (e.g., cabinets, room, buildings, and cities). The analytic server 110a may comprise, or may be in network-communication with profile database 110b and transaction database 110c.

The profile database 110b and transaction database 110c may be any non-transitory machine-readable media configured to store data. The profile database 110b may store data related with the user including user identification, user credentials, and user's pertinent information such as personal preferences, credit report, budget limits, financial goals, financial behaviors and other parameters or thresholds that may be pre-set by the user or generated by the server. For example, the user may pre-set a budget limit for "clothing" category for a month. As another example, the server may calculate the average value of the user's spending on "clothing" based on history transactions in past six months and set the average value as a budget limit for "clothing." The profile database may include other user related data that may be used to help the analytic server 110a provide financial management services to the user.

The transaction database 110c may store data related with the user's financial transactions under different financial accounts such as bank accounts, credit card accounts, mortgage accounts, loan accounts, investment accounts and the like. The analytic server 110a may access transaction data stored in the transaction database 110c and perform aggregation or categorizing based on the requests from the user. In addition, the analytic server 110a may perform other machine learning algorithms on data stored in the transaction database 110c to provide prediction and/or recommendation services to the user. For example, the user may request to keep track of his/her spending on "clothing" to make sure the spending is within a pre-set budget. The analytic server 110a may aggregate the transactions under category "clothing" for one account or across multiple accounts, depending on the request, so that the analytic server 110a may be able to remind the user if the user has spent too much on "clothing." As another example, the analytic server 110a may summarize the history transactions and learn that the user is looking to invest, so the analytic server 110a may provide investing advice or tips based on the user's investment style.

The profile database 110b and the transaction database 110c may be two separate databases or one database storing both profile data and transaction data.

The credit bureau server 150 may be a system configured to keep a record of the user's credit history from a number of sources, including banks, credit card companies, collection agencies, and governments. When a user fills out an application for credit from a bank, credit card company, or a store, the user's information is forwarded to a credit bureau server 150. The credit bureau server 150 may match the name, address and other identifying information on the credit application with information retained by the credit bureau server 150 in its files. The gathered records may thus include information from different accounts of the user. In one embodiment, the account information may comprise the full account number and corresponding bank information. In another embodiment, the account information may only include partial account number such as last four digits and corresponding bank information.

In operation, the analytic server 110a may request a credit report regarding a user from the credit bureau server 150 through the network 140. By analyzing the credit report, the analytic server 110a may be able to determine the accounts and corresponding bank information associated with the user. For example, the analytic server may determine that the user has a credit card account from Bank A with account number 000123456789. As another example, the analytic server may determine the user has another account from Bank B with account number XXXXXXXX2345.

With the account and bank information, the analytic server 110a may further access the bank system server 170 by querying the authentication data or online credential associated with each account. For example, the analytic server 110a may generate a request to receive the user's username and password for Bank A account and access the Bank A server by logging into the Bank A account. Similarly, the analytic server 110a may request the username and password for Bank B account and log into the Bank B server, where the analytic server may get the full account number.

The bank system servers 170a, 170b, 170c may store transactions occurred on each account of the user. The transaction information may comprise the transaction identification number, account number, transaction amount, transaction date, transaction type, merchant information, and the like. For example, the bank system server 170a may have a transaction record that states the user spent $200 dollars on "clothing" at Macy's on date Jan. 1, 2017 using BOA credit card at Arlington, VA. The analytic server 110a may access the bank system servers 170a, 170b, 170c through the network 140 to query such transaction information and do aggregation or categorizing based on the transactions.

The merchant system 160 may be any entities or organizations undertaking activities (commercial or industrial) for the purpose of generating profit. The user may make purchases at a merchant system online or in store. Moreover, the transactions may be recorded in a receipt and in the bank system server 170a, 170b, and 170c. Therefore, based on the transaction information stored in bank systems servers 170a, 170b, 170c, the analytic server 110a may determine the user's transactions. The analytic server 110a may track the related information of the user's purchase from the merchant system 160 through the network 140. If there is a change of transaction policy, for example, the price of the recent purchase drops, the analytic server 110a may notify the user with the change, so that the user may get a refund.

The email server 120 may comprise any non-transitory machine-readable media configured to store the user's email data. In operation, the email server 120 may store email data including transaction records, such as receipts of purchase, confirmation of opening a new account, confirmation of receiving a deposit to an account, and the like. The analytic server 110a may access the email server 120 through the network 140, scan the email content, and parse the words to identify the transaction records. The analytic server 110a may further check if the accounts of these transactions are already included in the credit report. If not, the analytic server 110a may aggregate the accounts from the email contents. So that the analytic server 110a may have a holistic view of the user's different accounts.

Figure 2:
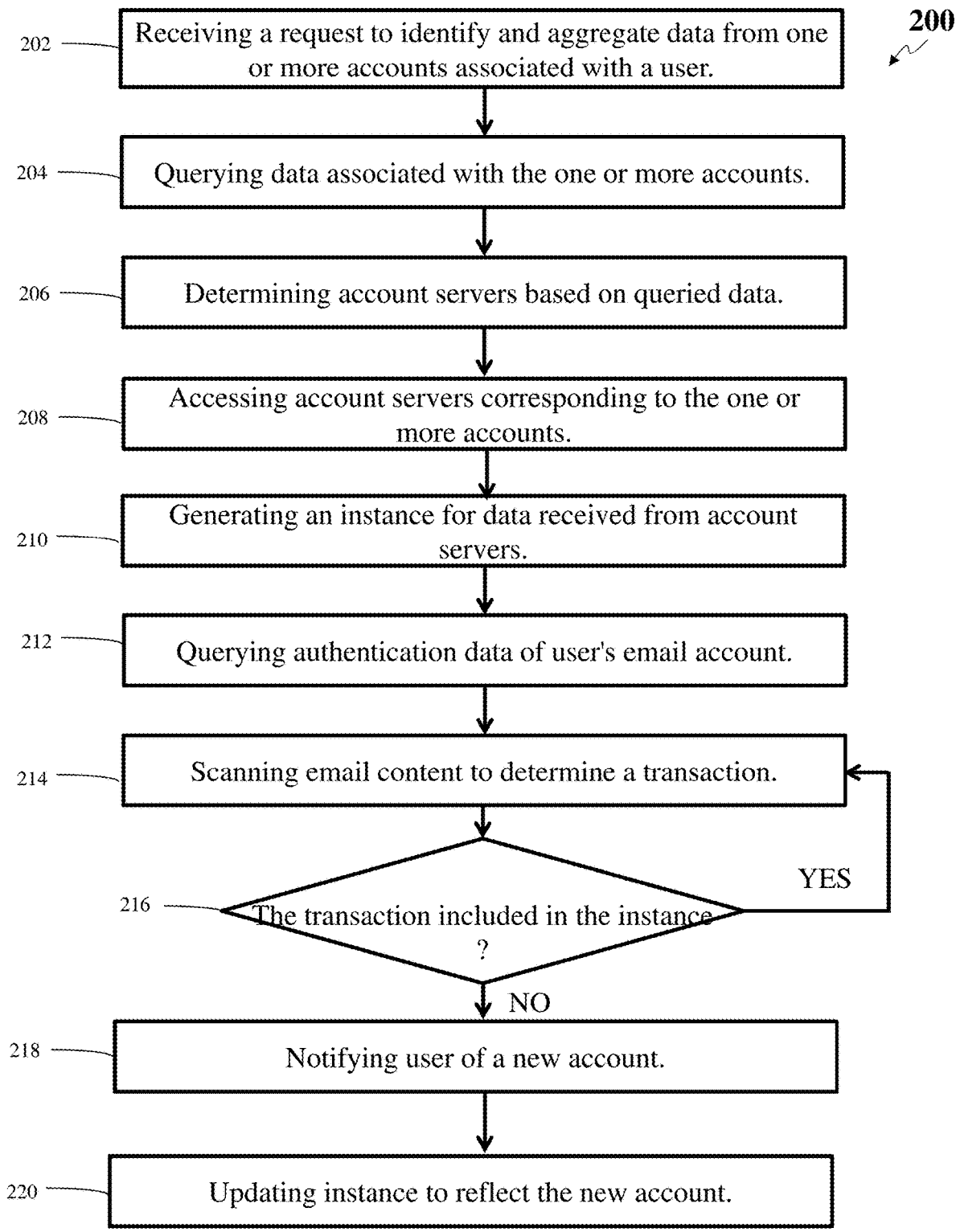
FIG. 2 illustrates a flowchart depicting operational steps for aggregating accounts, according to an embodiment.

FIG. 2 illustrates execution of a method 200 for aggregating accounts using email data, according to an embodiment. Other embodiments may comprise additional or alternative steps, or may omit some steps altogether.

At step 202, the analytic server may receive a request to identify and aggregate data from one or more accounts associated with a user. In operation, there may be one or more accounts associated with the user. The analytic server may identify the one or more accounts and aggregate data across the multiple accounts associated with the user. The user may browse a website in an Internet browser or a local application on an electronic client device. The website and application are provided and configured by the analytic server to receive requests from the user, such as the client device described in FIG. 1. The user may first enter credential information such as username, password, certificate, and biometrics. The request information from the user may also include other personal information including the user's data of birth, social security number, and other identification information that is unique to the user. The electronic client device may then transmit the user's inputs to the analytic server for authentication. The analytic server may access a profile database configured to store user credentials, which the analytic server may be configured to reference in order to determine whether a set of entered credentials (purportedly authenticating the user) match an appropriate set of credentials that identify the user's role. After the analytic server authenticates the user and/or determines the user's role, the analytic server may generate and serve webpages to the electronic client device where the webpages may relate to account aggregation services. For example, for a financial management application, the webpage may include bill management, budget management, and other related services.

At step 204, the analytic server may query data associated with the one or more accounts. For example, based on the credentials from the user such as social security number, the analytic server may generate an instruction to receive credit report from a credit bureau server. The credit bureau server may receive the instruction from the analytic server, and search a database based on the user's credentials such as social security number to identify records corresponding to the user. The credit bureau server may further return the user's credit report to the analytic server through the network. The returned credit report may include one or more accounts associated with the user.

At step 206, the analytic server may determine account servers based on the queried data. For example, after the analytic server receives the credit report associated with the user, the analytic server may determine one or more accounts issued to the user by parsing the words in the credit report. The credit report may be a computer readable file in various types (e.g., PDF, DOC, DOCX, XLS, and the like). If the credit report is not computer readable, such as a scanned document or an image, the analytic server may first convert the credit report into computer readable file by using optical character recognition algorithms. To determine one or more accounts in the credit report, the analytic server may parse the words and execute a search protocol for known account patterns. For example, when 9 to 12 sequential digits appear in the credit report, the digits may indicate an account number or otherwise be related to a user account. Furthermore, the analytic server may determine the corresponding server identification for each account. For example, the analytic server may not only determine that the user has an account with account number 000123456789, but also determine that this account is opened at (e.g., operated by) Bank A. To determine the server identification, the analytic server may have a database with a list of known banks that may issue an account, and search the credit report for the known banks (e.g., a referential table).

In some embodiments, the analytic server may also receive an indication of account servers directly from the user. For instance, the user may manually input account information and a corresponding account server.

At step 208, the analytic server may access accounts servers corresponding to the one or more accounts. In operation, the analytic server may first display a request to receive online credential to log into the account servers from the user. For example, the analytic server may display a graphical user interface on the electronic client device requesting for the login username and password for the Bank A account. In some configurations, the graphical user interface may be similar to the graphical user interface of Bank A. In other words, the analytic server may preserve the "look and feel" of the login webpage of Bank A. To achieve this, the analytic server may identify the login webpage for bank A and update a browser plate within the webpage displayed on the user's client device with at least a portion of the login webpage for bank A. In this way, the user views similar graphical features as displayed on Bank A's login webpage.

After the user enters such information on the user interface, the analytic server may further send a request to the account server and request access to datasets of the one or more accounts. For example, the analytic server may request to log in the user's Bank A account by inputting the username and password on Bank A website on behalf of the user. Alternatively, the analytic server may query the server of Bank A and use the user's authentication information to login. If the user has multiple accounts, the analytic server may request the online credential associated with each of them, and try to log in each corresponding server. The dataset stored in each account server may include information of transactions occurred on the corresponding account.

The analytic server may also store user's login credentials in a local or external database. In some embodiments, the user's login credentials may be encrypted in a manner that is not viewable to the analytic server or an operator of the analytic server. For instance, upon receiving the user's login credentials, the analytic server (or a third-party encryption server) may generate a hash for the user's login credentials based on a hashing algorithm. Furthermore, the analytic server may only store the encrypted version of the user's login credentials onto its database. The analytic server may separately create a referential table that indicates a corresponding account for the login credentials. For instance, the referential table may indicate that the login credentials received from the user corresponds to Bank A. In some configurations, the analytic server may also encrypt the referential table. In this way, the analytic server minimizes the chance of data compromise in case of a cyber-attack. For instance, even if a bad actor successfully obtains the user's login credentials, the bad actor will have to decrypt the login credentials, decrypt the referential table, and determine a corresponding account for the login credentials.

At step 210, the analytic server may generate an instance for data received from the account servers. The data may include one or more transactions, transaction identifier number, account number, and transaction amount. In some embodiments, the analytic server may first query one or more transactions associated with the user comprising transaction identifier number, account number, and transaction amount from the account server, then store the records of transaction information on each account in the local transaction database. As a result, the analytic server may be able to do aggregation across multiple accounts, and provide different services to the user based on the aggregation results. In one embodiment, the analytic server may periodically update the instance to include new transactions on the accounts. For example, the analytic server may access and update the account server on a daily basis, based on another predetermined frequency received by the user or another electronic device, or based on a frequency of receipt of transactions.

In some configurations, the analytic server may repeat the above-mentioned steps for each account associated with the user. For example if the user indicates that the user has created an account with Bank B, the analytic server repeats the above-mentioned steps and receives transaction data from account servers of Bank B.

At step 212, the analytic server may query authentication data or email credential of user's email account. The analytic server may display a graphic user interface on the electronic client device requesting for the authentication data associated with the user's email account. For example, the graphic user interface may require the user to enter the email address and the login password associated with the user's email account. As described above, the analytic server may preserve the look and feel of the login page. The analytic server may also encrypt uses credentials using the above-mentioned methods.

The user's email account may be configured to receive transaction confirmations (e.g., receipts) associated with the user. Furthermore, the email content may include transactions that are not included in the instance generated by the analytics server (step 210). For example, the instance may only include transactions corresponding to the accounts identified from the credit report. However, after the analytic server queries the credit report, the user may open a new account. This new account and transactions associated with the new account may not be included in the instance.

As another example, the credit bureau server may match name, address and other identifying information of the user's new credit application with information retained by the credit bureau server in its file. However, this matching process may miss one or more accounts of the user due to a change of address or a change of name. Alternatively, the credit bureau server may not include an account due to administrative delay or network problems. Thus, some of the user's accounts may not be captured by the credit bureau server, and may be missing in the instance. However, such accounts and the related transactions may be included in the user's email content.

In step 214, the analytic server may continuously scan the email content to determine transactions associated with the user. The analytic server may first log into the email address using the authentication data or email credential received from the user to access the content of the user's email account. The analytic server may input the user's email credential into a website associated with the user's email account to login and access the email content. Then the analytic server may identify potentially unknown transactions associated with the user by parsing the words in the email content.

Since the email content may include different types of data, e.g., the user may have communicated with different entities or individuals, the analytic server may need to identify the transaction-related data while excluding other unrelated data by parsing the content of each individual email message. An example of an identified transaction may be a receipt of a purchase, confirmation of a deposit into an account, confirmation of a refund, and the like. The identified transaction may include transaction identifier number, account number, transaction amount and other related information. The analytic server may identify the potentially unknown transactions in email format, document format and image format. For example, the receipts of transactions may be included in the email content as text or as a document or an image attached in the email message. Thus, the analytic server may parse the whole email message including the email content and the attachments to identify transactions. Furthermore, the receipts may be from a scanned document, a photo, a PDF file or any other suitable document. The analytic server may convert the images into machine-encoded text by using character recognition algorithms and protocols. Then the analytic server may read the document or text and parse the words of the email messages to identify transactions. For example, the analytic server may have a database including transaction words that are frequently used in different transactions. By reading and parsing the words in readable documents, the analytic server may search for the known transaction words in the receipt documents, if the number of known transaction words satisfies a threshold, the analytic server may determine the receipt is transaction-related.

In step 216, the analytic server may determine if a transaction identified from the email content is associated with the one or more accounts in the instance (e.g., included in the instance). If the transaction is not associated with accounts in the instance, the process goes to step 218; otherwise, the process goes to step 214 to continue scanning the email content.

In one embodiment, the analytic server may determine if the identified transaction is included in the instance based on the transaction identifier. In other words, the analytic server may determine if the transaction identifier of a transaction identified from the email content matches one of the transactions in the instance. For example, Visa assigns a 15-character value to each transaction and returns the value to the acquirer in the authorization response. Visa uses this value as a transaction identifier to maintain an audit trail throughout the life cycle of the transaction and all related transactions, such as reversals, adjustments, confirmations and charge-backs. The receipt from the email account may include the transaction identifier. Since the transaction identifier is unique to each transaction, the analytic server may search the instance in local transaction database for the transaction identifier. If the transaction identifier is found, the corresponding account is already included in the instance; otherwise, the corresponding account of the transaction is not included in the instance.

In another embodiment, the analytic server may determine if the identified transaction is included in the instance based on the account identifier (e.g., account number). For example, a receipt may include the last four digits of the account or the full account number used for a payment. The analytic server may first check if the four digits or the full account number matches one of the accounts in the instance. If it does, the transaction is associated with an account already identified and included in the instance. In other words, the account from the email content is not a new account or an account missed from the credit report. Otherwise, the account corresponding to the transaction from the email content is not included in the instance. In case the account number in a receipt only includes the last four digits of the account, the analytic server may first check if the four digits match one of the accounts in the instance. After the analytic server finds a match, the analytic server may further check if other related information matches too, such as the transaction date, transaction type, transaction amount, merchant information or transaction address and the like. If all the related information matches, the analytic server may determine the account and transaction from the email content is included in the instance.

In another embodiment, the analytic server may determine if the identified transaction is included in the instance based on the transaction amount and other related transaction information. In some implementations, the receipt of a transaction may not include information that can be directly used to associate the transaction to an account, such as the transaction identifier or account number. Instead, the receipt may only include transaction related information such as amount, merchant information, transaction date and the like. In this case, the analytic server may need to combine several related information together to identify the transaction in the instance and further determine the associated account. For example, the receipt may include information that the user spent $123.5 on Jan. 1, 2017 at Store A. The analytic server may search the instance based on the amount, the date and the merchant for matching transactions. If the analytic server finds such a transaction, the analytic server may determine that the transaction is associated with an account already identified and included in the instance. Otherwise, the corresponding account of this transaction is not included in the instance.

In case the receipt does not include account information but only transaction related information, and the analytic server has determined there is no matching transaction in the instance, the analytic server may determine the transaction is associated with a new account that has not been aggregated. The analytic server may further need to determine the account number. For example, the analytic server may ask the user to identify the account number of the transactions that are not included in the instance. For example, the analytic server may display a graphic user interface saying "on Jan. 1, 2017 you spent $123.5 at Store A, which account did you use to make the payment?" In this way, the analytic server may be able to determine the new account for transactions not included in the instance, and further aggregate the new account.

The analytic server may use other strategies besides the strategies described above to determine if the transaction is associated with an account in the instance. The analytic server may combine different strategies based on available transaction information.

In step 218, the analytic server may notify the user of a new account that is not aggregated or included in the instance. Once the analytic server has determined a transaction in the email content is not in the instance, the analytic server may determine that the transaction is associated with a new account that has not been aggregated. The analytic server may generate a notification (e.g., generate a push notification or an automated email) comprising identification associated with the new account to alert the user. For example, the analytic server may display a graphic user interface that include the new account and relative transactions to remind the user that this new account is not yet aggregated. The analytic server may further ask the user's permission to aggregate this new account.

In some embodiments, the notification may include a hyperlink directing the user to provide the login credentials. For instance, when the user receives a notification and interacts with a hyperlink, the analytic server may direct the user to a webpage having one or more inputs fields configured to receive user's login credentials to the newly identified account. The analytic server may use the above-mentioned methods to receive, encrypt, store the user's login credentials for the newly identified account.

In step 220, the analytic server may update the instance to reflect the new account. In operation, the analytic server may save the new account and transactions associated with the new account to the transaction database. As the instance stored in the transaction database has already included the accounts identified from the credit report and the associated transactions, by saving new accounts identified from the email content, the transaction database may include all of the user's accounts and the transactions on each account. As a result, the analytic server may provide services based on aggregation results of the user's all accounts. For example, in a financial management application, the analytic server may have a hostile view of the user's finance and may provide more accurate services or advices to the user. In some implementations, the analytic server may learn the user's behavior based the transactions across multiple accounts by machine learning algorithms. Moreover, the analytic server may recommend tailored services and products to the user based on the user's behavior.

Figure 3A:
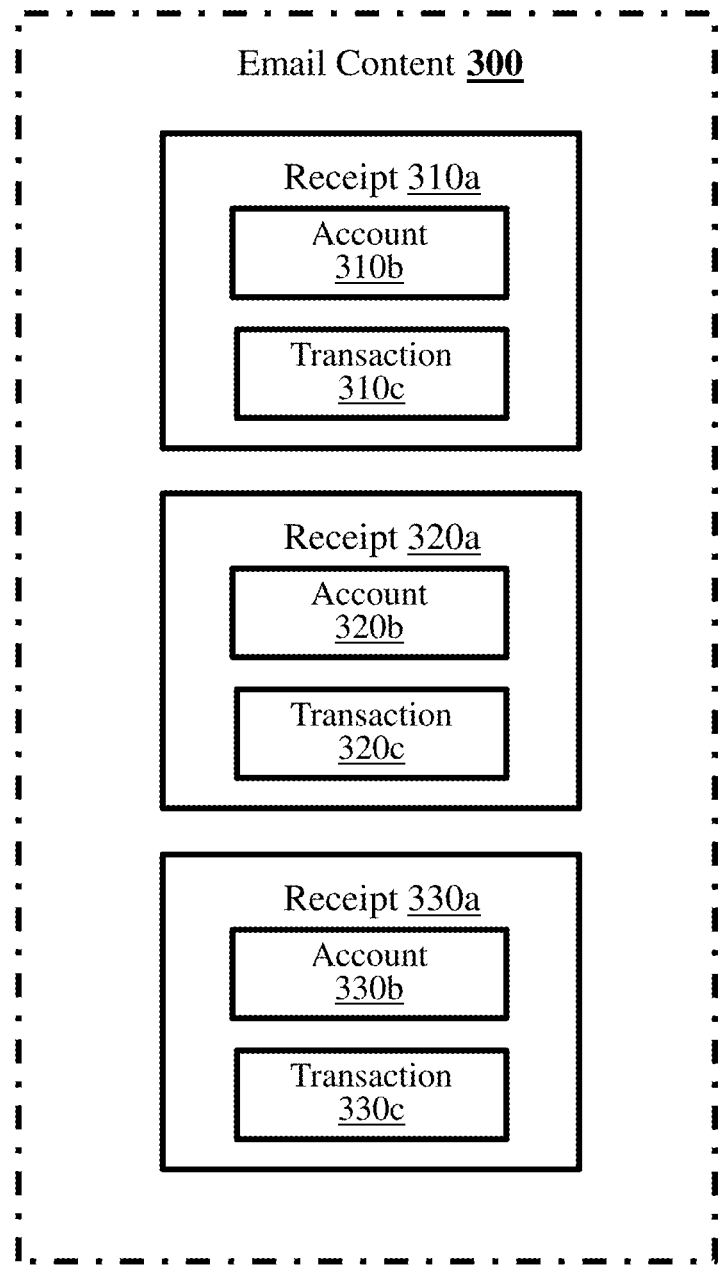
FIG. 3A illustrates an example of accounts based on email content, according to an embodiment.

FIG. 3A illustrates an example of accounts identified from email content 300, according to an embodiment. The analytic server may scan the email content 300 on daily basis (or another predetermined time period) and identify three receipts in the email content: receipt 310a, receipt 320a and receipt 330a. Each receipt may include account and transaction information associated with the account. For example, receipt 310a may include account 310b and transaction information 310c; receipt 320a may include account 320b and transaction information 320c; and receipt 330a may include account 330b and transaction information 330c. The transactions information 310c, 320c, 330c may include transaction identifier and/or any other transaction related information, such as transaction date, amount, merchant and the like. The transaction could refer to any purchase, refund, deposit, withdrawal, and/or any other activity on an account. Receipts 310a, 320a, and 330a may be receipts of transactions of accounts already included and aggregated, as stored within the instance. In contrast, the above-mentioned receipts may be associated with new account that have not been updated/included and aggregated in the instance. In one embodiment, before the analytic server scans the email content, the analytic server may access (e.g., query) the bank system servers and update the instance to include the most recent transactions associated with the aggregated accounts. As a result, the analytic server may update the instance with the transactions identified from the email content (e.g., transactions 310c, 320c, and 330c) when these transactions are associated with an aggregated account. If a transaction does not match any transaction associated with an account in the instance, the analytics server may update the instance with the unmatched transaction (and the corresponding account information).

Figure 3B:
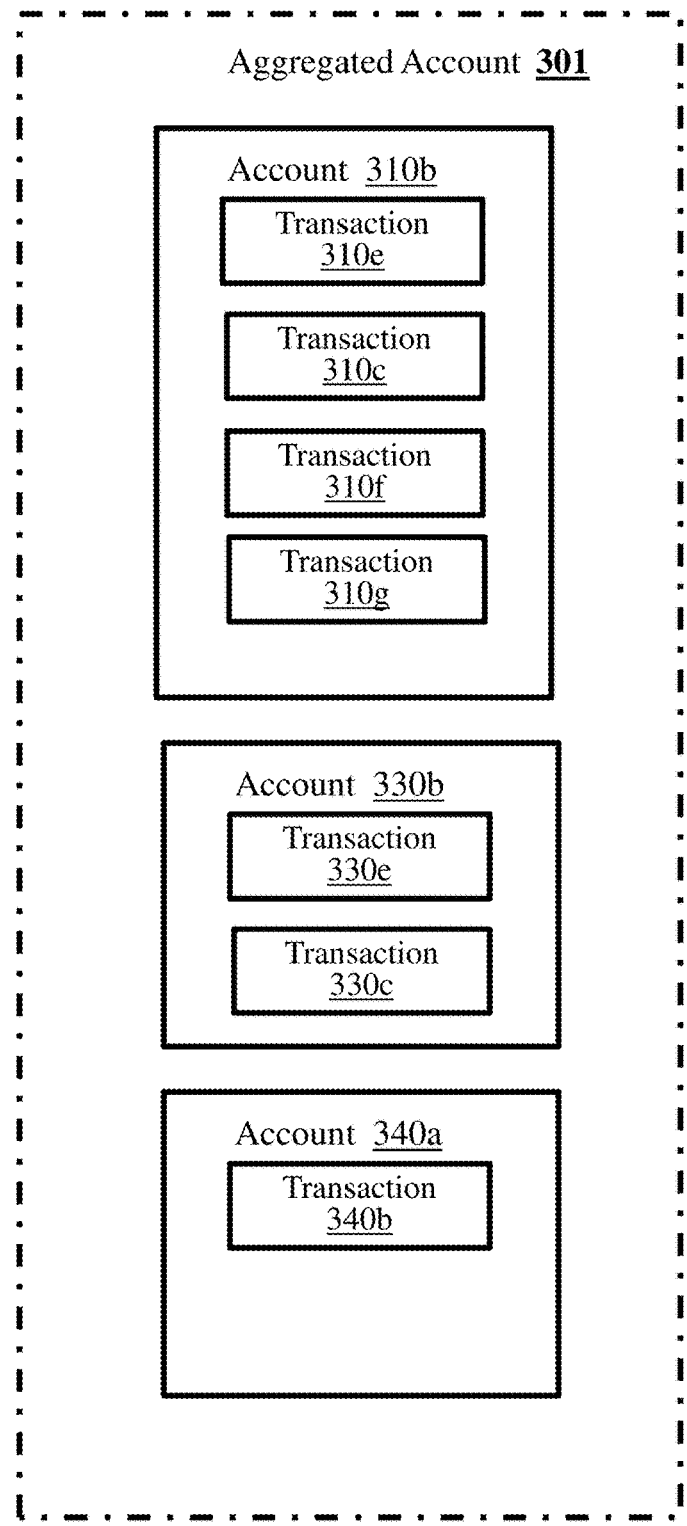
FIG. 3B illustrates an example of aggregated accounts based on a credit report, according to an embodiment.

FIG. 3B illustrates an example of aggregated accounts 301 based on a credit reports, according to an embodiment. The analytic server may aggregate the accounts that can be identified from a credit report. For example, the analytic server may determine that the user has three accounts from the credit report: account 310b, account 330b, and account 340a (described in FIG. 2). The analytic server may further access the bank system servers to query transactions associated with each account. The analytic server may generate an instance in a transaction database that may include and aggregate each account and the transactions associated with said account. For example, account 310b may have four transactions, including transaction information 310c, 310e, 310f, and 310g. Account 330b may have two transaction including transaction information 330e and 330c. Additionally, there may be another account 340a having one transaction (e.g., 340b). The analytic server may compare the transaction information in the instance with the transaction information from the email content, and determine that the transaction information 310c on account 310b and transaction 330c on account 330b are in both instance and the email content. In other words, the analytic server may have aggregated the accounts associated with these two transactions. However, the other transaction 320c on account 320b identified from the email content may not match any transactions in the instance stored within the transaction database. In other words, the account 320b is an account the analytic server has not aggregated.

Figure 3C:
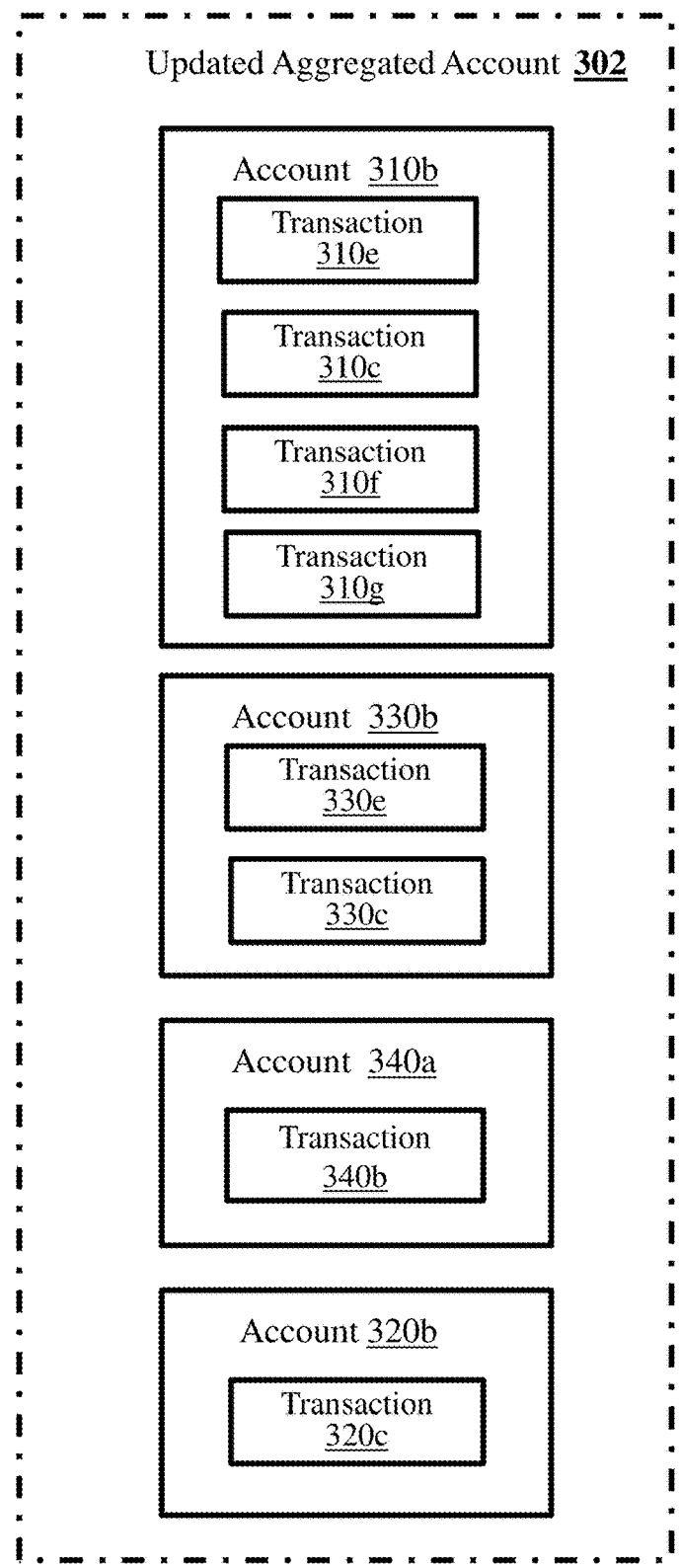
FIG. 3C illustrates an example of updated aggregated accounts based on transactions from email content, according to an embodiment.

FIG. 3C illustrates an example of updated aggregated accounts 302 based on transactions from the email content, according to an embodiment. The analytic server may update the instance of the aggregated accounts by including the account 320b in the instance. As shown, besides the accounts 310b, 330b, 340a that have existed in aggregated account 301 and their corresponding transactions, the updated aggregated account 302 may also include the account 320b that was identified from scanning the email content 300 and not included within the aggregated account 301 and transaction 320c of account 320b. As a result, the analytic server may aggregate all of the accounts associated with the user. In some embodiments, the analytic server may automatically scan the email content and update the aggregated accounts periodically. In other embodiments, the user may initialize the scanning and updating by sending a request to the analytic server.

Figure 4:
FIG. 4 illustrates an example of a graphical user interface for entering email credential, according to an embodiment.

FIG. 4 illustrates an example of a graphical user interface 400 for entering email credential, according to an embodiment. The analytic server may display a graphic user interface on the electronic client device requesting for the authentication data associated with the user's email account. For example, the graphic user interface may include text-based interactive elements that require the user to enter the email address 402 and the login password 404 associated with the user's email account. The analytic server may preserve the look and feel of the login page of the email server. After the analytic server receives the email credential, the analytic server may be able to access the user's email data.

Figure 5:
FIG. 5 illustrates an example of a graphical user interface for parsing email data, according to an embodiment.

FIG. 5 illustrates an example of a graphical user interface 500 for parsing email data, according to an embodiment. The analytic server may log into the email address using the email credential received from the user to access the content of the user's email account. The analytic server may use screen scraping protocol to identify each word of the email message. The analytic server may parse the words in the email content and identify transaction-related data, such as a receipt of a transaction. The analytic server may further identify account number/card number 502, transaction amount 504, transaction date 506, transaction type 508, transaction identifier 510 and any other related information of the transaction by parsing the words. For example, the analytic server may look for the word "payment" or "amount" and/or dollar symbol "$" to identify the transaction amount 504. The analytic server may look for card names of different financial organizations (e.g., "Visa," "MasterCard") and a certain number of characters and sequential digits in a specific pattern, such as XXXX-XXXX-XXXX-the last four digits of an account or a card, to identify the account number/card number 502 of the transaction. Based on the transaction information, the analytic server may if the transaction is associated with one or more accounts in the instance. If the transaction is not associated with any accounts in the instance, the analytic server may determine the transaction is associated with a new account, and notify the user of the new account.

The foregoing method descriptions and the process flow diagrams are provided merely as illustrative examples and are not intended to require or imply that the steps of the various embodiments must be performed in the order presented. The steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, and the like. When a process corresponds to a function, the process termination may correspond to a return of the function to a calling function or a main function.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of this disclosure or the claims.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the claimed features or this disclosure. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the embodiments described herein and variations thereof. Various modifications to these embodiments will be readily apparent to those skilled in the art, and the generic principles defined herein may be applied to other embodiments without departing from the spirit or scope of the subject matter disclosed herein. Thus, the present disclosure is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A method comprising:
   receiving, by a server from an electronic client device operated by a user, a first request to identify and aggregate transaction data from one or more known accounts associated with the user, the first request comprising authentication credentials for each account within the one or more known accounts;
   querying, by the server using the received authentication credentials, a first website associated with each account within the one or more known accounts to identify one or more transactions associated with the one or more known accounts, where each transaction within the one or more transactions comprises a first account identifier corresponding to at least one account within the one or more known accounts;
   generating, by the server, an instance within a database corresponding to the user and comprising the one or more transactions associated with each known account;
   generating, by the server, a graphical user interface comprising one or more inputs fields configured to receive an email credential of n email account, wherein the server identifies a login webpage associated with the email account of the user, and updates a browser plate within the graphical user interface with a portion of the login webpage to preserve a look and feel of the login webpage;
   displaying, by the server on the electronic client device, the graphical user interface comprising one or more inputs fields configured to receive the email credential of the email account associated with the user;
   upon transmitting the email credential to a email server associated with the email account, accessing, by the server from the email server, emails associated with the email account;
   continuously scanning, by the server, content from the emails accessed from the email server, wherein the scanning comprises at least recognizing characters and parsing words of each email message and each email message attachment to identify an image;
   determining, by the server, using a character recognition protocol to convert the image into machine-encoded text, that the image comprises a receipt image indicating a potentially unknown transaction, wherein determining that the image comprises the receipt image is responsive to a number words in the machine-encoded text that match known transaction words identified in a word database satisfying a threshold, wherein an unknown transaction is a transaction associated with a new account;
   determining, by the server, a second account identifier from the machine-encoded text generated from the receipt image, the second account identifier associated with the potentially unknown transaction and corresponding to the new account;
   determining, by the server, whether the second account identifier associated with the potentially unknown transaction corresponds to at least one account within the one or more known accounts by identifying whether the instance in the database comprises the second account identifier;
   when the second account identifier associated with the potentially unknown transaction does not correspond to at least one account within the one or more known accounts:
      querying the database for a combination of an amount, a date, and a merchant of the potentially unknown transaction to determine that the potentially unknown transaction is associated with a known account;
      when the transaction is not found in the database, generating, by the server, a notification to alert the user regarding the second account identifier, wherein the notification includes a hyperlink directing the user to the graphical user interface having at least one input element configured to receive login credentials of the new account;
      upon receiving the login credentials of the new account, encrypting, by the server, the loin credentials for secure future access to the new account; and
      updating, by the server, the instance within the database to reflect the new account by adding the second account identifier, the encrypted loin credentials, and the potentially unknown transaction into the database.

2. The method of claim 1, wherein the first request comprises identification information of a social security number associated with the user.

3. The method of claim 1, further comprising:
   determining, by the server, a bank system server corresponding to each account within the one or more accounts; and
   accessing, by the server, the bank system server to query the one or more transactions associated with each account.

4. The method of claim 1, further comprising:
   querying, by the server from a third party credit bureau server, a credit report comprising account data associated with the user.

5. The method of claim 1, further comprising:
   identifying, by the server, the potentially unknown transaction in email format, document format and image format.

6. The method of claim 1, further comprising:
   tracking, by the server from merchant systems, transaction policy of the one or more transactions associated with each account and the potentially unknown transaction associated with the second account identifier; and
   notifying, by the server, the user regarding changes of the transaction policy.

7. The method of claim 1, further comprising:
recommending, by the server, tailored services and products to the user based upon the one or more transactions associated with each account and the potentially unknown transaction associated with the second account identifier.

8. The method of claim 1, further comprising:
aggregating, by the server, transactions under a category across multiple accounts.

9. The method of claim 1, wherein the email credential comprises email address and login password.

10. The method of claim 1, further comprising:
determining, by the server, a transaction amount of the potentially unknown transaction from the receipt image;
determining, by the server, whether the transaction amount of the potentially unknown transaction in the email message is included in the instance;
when the transaction amount of the potentially unknown transaction is not included in the instance, determine the second account identifier associated with corresponding to the new account from which the potentially unknown transaction originated;
generating, by the server, a notification to alert the user regarding the second account identifier; and
updating, by the server, the instance within the database to reflect the new account by adding the second account identifier and the potentially unknown transaction into the database.

11. A system comprising:
an electronic client device, a server in communication with the electronic client device and configured to:
receive, from the electronic client device operated by a user, a first request to identify and aggregate transaction data from one or more known accounts associated with the user, the first request comprising authentication credentials for each account within the one or more known accounts;
query, using the received authentication credentials, a first website associated with each account within the one or more known accounts to identify one or more transactions associated with the one or more known accounts, where each transaction within the one or more transactions comprises a first account identifier corresponding to at least one account within the one or more known accounts;
generate an instance within a database corresponding to the user and comprising the one or more transactions associated with each known account;
generate a graphical user interface comprising one or more inputs fields configured to receive an email credential of an email account, wherein the server identifies a login webpage associated with the email account of the user, and updates a browser plate within the graphical user interface with a portion of the login webpage to preserve a look and feel of the login webpage;
display, on the electronic client device, the graphical user interface comprising the one or more inputs fields configured to receive the email credential of the email account associated with the user;
upon transmitting the email credential to a email server associated with the email account, access, from the email server, emails associated with the email account by;
continuously scan content from the emails accessed from the email server, wherein the scanning comprises at least recognizing characters and parsing words of each email message and each email message attachment to identify an image;
determine, using a character recognition protocol to convert the image into machine-encoded text, that the image comprises a receipt image indicating a potentially unknown transaction, wherein determining that the image comprises the receipt image is responsive to a number words in the machine-encoded text that match known transaction words identified in a word database satisfying a threshold, wherein an unknown transaction is a transaction associated with new account;
determine a second account identifier from the machine-encoded text generated from the receipt image, the second account identifier associated with the potentially unknown transaction and corresponding to the new account;
determine whether the second account identifier associated with the potentially unknown transaction corresponds to at least one account within the one or more known accounts by identifying whether the instance in the database comprises the second account identifier;
when the second account identifier associated with the potentially unknown transaction does not correspond to at least one account within the one or more known accounts:
query the database for a combination of an amount, a date, and a merchant of the potentially unknown transaction to determine that the potentially unknown transaction is associated with a known account;
when the transaction is not found in the database, generate a notification to alert the user regarding the second account identifier, wherein the notification includes a hyperlink directing the user to the graphical user interface having at least one input element configured to receive login credentials of the new account;
upon receiving the login credentials of the new account, encrypt the login credentials for secure future access to the new account; and
update the instance within the database to reflect the new account by adding the second account identifier, the encrypted login credentials, and the potentially unknown transaction into the database.

12. The system of claim 11, wherein the first request comprises identification information of a social security number associated with the user.

13. The system of claim 11, wherein the server is further configured to:
determine a bank system server corresponding to each account within the one or more accounts; and
access the bank system server to query the one or more transactions associated with each account.

14. The system of claim 11, wherein the server is further configured to:
query, from a third party credit bureau server, a credit report comprising account data associated with the user.

15. The system of claim 11, wherein the server is further configured to:
identify the potentially unknown transaction in email format, document format and image format.

16. The system of claim 11, wherein the server is further configured to:

track, from merchant systems, transaction policy of the one or more transactions associated with each account and the potentially unknown transaction associated with the second account identifier; and notify the user regarding changes of the transaction policy.

17. The system of claim 11, wherein the server is further configured to:

recommend tailored services and products to the user based upon the one or more transactions associated with each account and the potentially unknown transaction associated with the second account identifier.

18. The system of claim 11, wherein the server is further configured to:

aggregate transactions under a category across multiple accounts.

19. The system of claim 11, wherein the email credential comprises email address and login password.

20. The system of claim 11, wherein the server is further configured to:

determine a transaction amount of the potentially unknown transaction from the receipt image;

determine whether the transaction amount of the potentially unknown transaction in the email message is included in the instance;

when the transaction amount of the potentially unknown transaction is not included in the instance, determine the second account identifier associated with the new account from which the potentially unknown transaction originated;

generate a notification to alert the user regarding the second account identifier; and update the instance within the database to reflect the new account by adding the second account identifier and the potentially unknown transaction into the database.

* * * * *